(12) United States Patent
Gagne et al.

(10) Patent No.: US 9,008,576 B2
(45) Date of Patent: Apr. 14, 2015

(54) MOBILE COMMUNICATIONS DEVICE PROVIDING NFC APPLET COMPATIBILITY FEATURES AND RELATED METHODS

(75) Inventors: Marie Anita Brigitte Gagne, Ottawa (CA); Ravi Singh, Toronto (CA); Vincenzo Kazimierz Marcovecchio, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 346 days.

(21) Appl. No.: 13/555,490

(22) Filed: Jul. 23, 2012

(65) Prior Publication Data
US 2013/0102246 A1 Apr. 25, 2013

Related U.S. Application Data

(60) Provisional application No. 61/550,044, filed on Oct. 21, 2011.

(51) Int. Cl.
*H04B 17/00* (2006.01)
*H04M 1/725* (2006.01)
*G06Q 20/32* (2012.01)
*G06Q 20/36* (2012.01)

(52) U.S. Cl.
CPC ......... *H04M 1/7253* (2013.01); *G06Q 20/3278* (2013.01); *H04M 2250/04* (2013.01); *G06Q 20/3226* (2013.01); *G06Q 20/36* (2013.01)

(58) Field of Classification Search
CPC .......................... G06K 20/3278; G06K 20/32
USPC ....................... 455/41.1, 41.2, 41.3
See application file for complete search history.

(56) References Cited

U.S. PATENT DOCUMENTS

| 8,116,678 B2 * | 2/2012 | Johnson et al. ............... 455/41.1 |
| 8,799,574 B2 * | 8/2014 | Corda ........................... 711/115 |
| 2009/0191812 A1 | 7/2009 | Teruyama et al. |
| 2010/0134293 A1 * | 6/2010 | Fujishiro et al. ........... 340/572.7 |
| 2010/0227553 A1 | 9/2010 | Charrat et al. |

FOREIGN PATENT DOCUMENTS

EP 2106108 9/2009

* cited by examiner

*Primary Examiner* — Nay A Maung
*Assistant Examiner* — Angelica M Perez
(74) *Attorney, Agent, or Firm* — Allen, Dyer, Doppelt, Milbrath & Gilchrist, P.A.

(57) ABSTRACT

A mobile communications device may include a near field communication (NFC) device, and a processor coupled with the NFC device. The processor may be configured to operate a first NFC applet and a second NFC applet, determine whether concurrent enabling of the first NFC applet and the second NFC applet will cause a compatibility conflict, and concurrently enable the first NFC applet and the second NFC applet for communicating data via the NFC device based upon a determination that concurrent enabling of the first NFC applet and the second NFC applet will not cause the compatibility conflict.

22 Claims, 6 Drawing Sheets

MOBILE COMMUNICATIONS DEVICE PROVIDING NFC APPLET COMPATIBILITY FEATURES AND RELATED METHODS

RELATED APPLICATIONS

This application is based upon prior filed provisional application Ser. No. 61/550,044 filed Oct. 21, 2011; the disclosures of which are incorporated herein by reference in their entirety.

TECHNICAL FIELD

This application relates to the field of communications, and more particularly, to mobile wireless communications systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology such as near field communication (NFC) technology. NFC technology may be used for contactless short-range communications based, for example, on radio frequency identification (RFID) standards, using magnetic field induction to enable communication between electronic devices, including mobile communications devices. This short-range high frequency wireless communications technology may exchange data between devices over a short distance, such as only a few centimeters.

DETAILED DESCRIPTION

Figure 1:
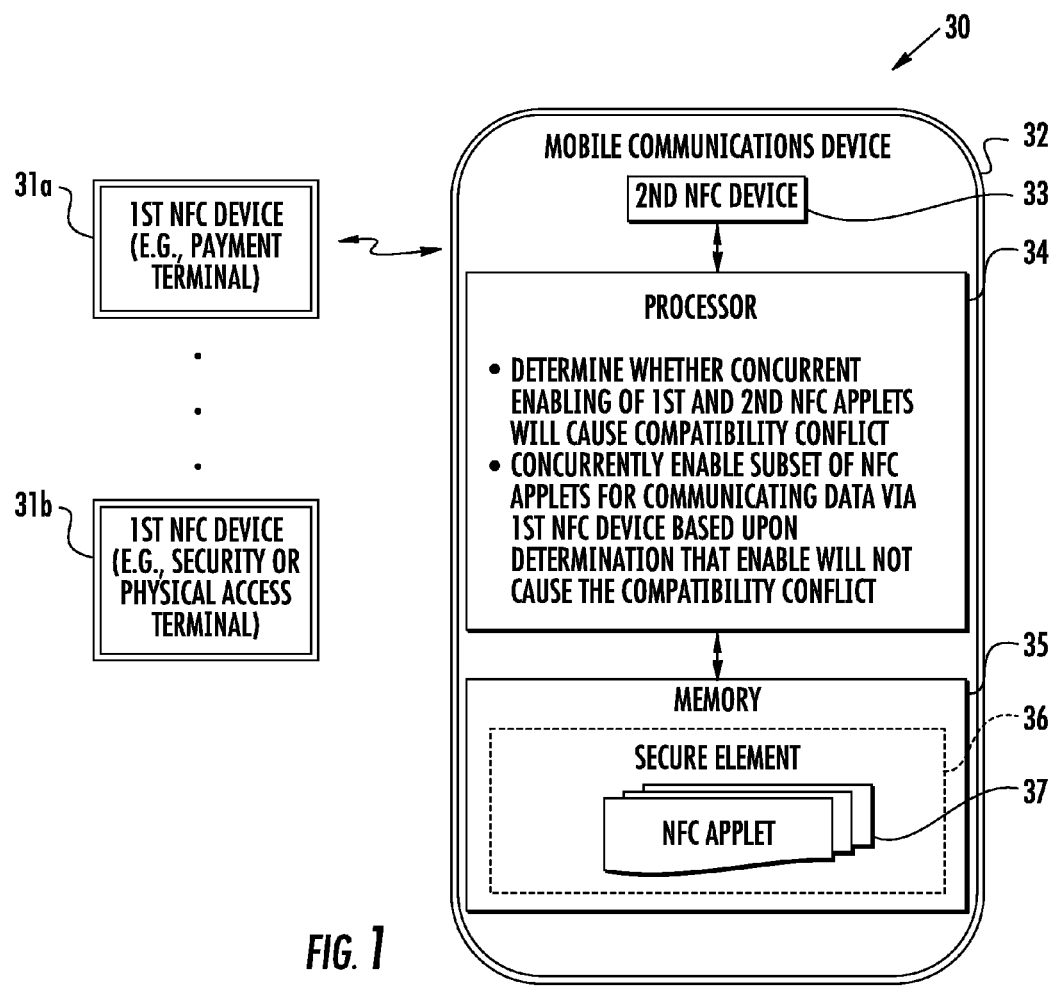
FIG. 1 is a schematic block diagram of a communications system in accordance with one example aspect.

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a mobile communications device is provided herein which may include a near field communication (NFC) device, and a processor coupled with the NFC device. The processor may be configured to operate a first NFC applet and a second NFC applet, determine whether concurrent enabling of the first NFC applet and the second NFC applet will cause a compatibility conflict, and concurrently enable the first NFC applet and the second NFC applet for communicating data via the NFC device based upon a determination that concurrent enabling of the first NFC applet and the second NFC applet will not cause the compatibility conflict. As such, this allows for concurrent availability of different NFC applications while helping prevent conflicts between them, and may do so without the different NFC applications having to communicate or coordinate with one another.

More particularly, the NFC device may be configured to operate in accordance with a first NFC frequency or a second NFC frequency. Furthermore, the first NFC applet may be associated with the first NFC frequency and the second NFC applet may be associated with the second NFC frequency. As such, the compatibility conflict may include an attempt to operate the NFC device at both the first NFC frequency and the second NFC frequency simultaneously.

Additionally, the first NFC applet and the second NFC applet may each have at least one respective applet identification (ID) associated therewith, and the compatibility conflict may include a conflict between the formats of the respective applet IDs. Furthermore, the processor may be configured to determine whether concurrent enabling of the subset of the first NFC applet and the second NFC applet will cause a compatibility conflict based upon requests to enable the first NFC applet and the second NFC applet. The processor may be further configured to provide a notification if a compatibility conflict is determined to exist.

By way of example, the first NFC applet may comprise a NFC payment applet, a physical access NFC applet, etc. In addition, the mobile communications device may further include at least one memory coupled with the processor and defining a plurality of secure elements configured to store NFC applets. Moreover, the processor may be configured to determine that concurrent enabling of the first NFC applet and the second NFC applet will cause a compatibility conflict based upon the first NFC applet and the second NFC applet being stored on different secure elements.

A related communications system may include at least one first near field communication (NFC) device and a mobile communications device, such as the one described briefly above. A communications method may include, at a mobile communications device comprising a near field communication (NFC) device and being configured to operate a first NFC applet and a second NFC applet, determining whether concurrent enabling of the first NFC applet and the second NFC applet will cause a compatibility conflict. The method may further include, at the mobile communications device, concurrently enabling the first NFC applet and the second NFC applet for communicating data via the NFC device based upon a determination that concurrent enabling of the first NFC applet and the second NFC applet will not cause the compatibility conflict.

A related non-transitory computer-readable medium may be for a mobile communications device, such as the one described briefly above. The non-transitory computer-readable medium may have computer-executable instructions for causing the mobile communications device to perform steps including determining whether concurrent enabling of the first NFC applet and the second NFC applet will cause a compatibility conflict, and concurrently enabling the first NFC applet and the second NFC applet for communicating data via the NFC device based upon a determination that concurrent enabling of the first NFC applet and the second NFC applet will not cause the compatibility conflict.

Figure 2:
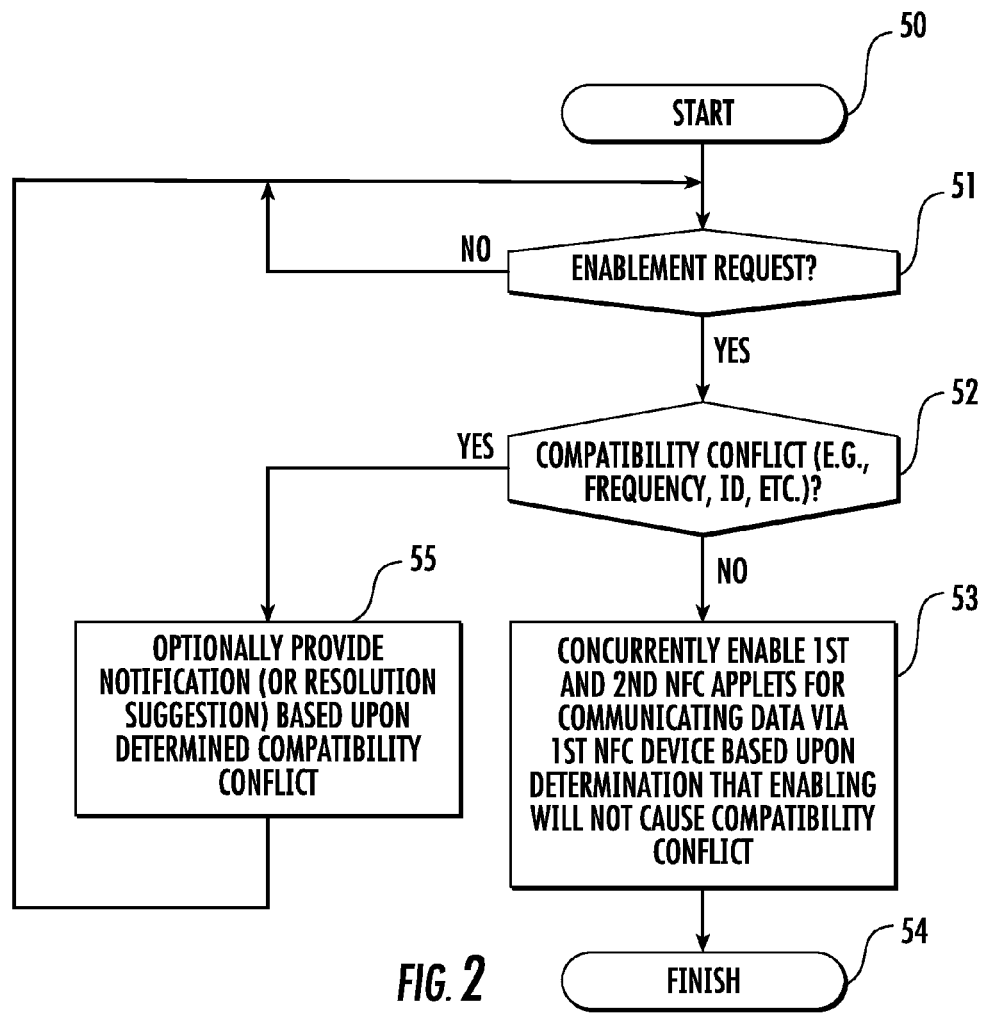
FIG. 2 is a flow diagram illustrating method aspects associated with the system of FIG. 1.

Referring initially to FIGS. 1 and 2, a communications system 30 and related method aspects are first described. The system 30 illustratively includes one or more first NFC devices 31a, 31b. By way of example, the first NFC devices 31a, 31b may comprise NFC readers (e.g., active NFC devices) associated with, for example, payment terminals (e.g., point-of-sale terminals, subway or bus fare terminals, etc.), security or physical access terminals (e.g., building or gate access), etc. However, in some implementations the first NFC devices 31a, 31b may comprise passive NFC devices (e.g. NFC tags).

By way of background, NFC is a short-range wireless communications technology in which NFC-enabled devices may be "swiped," "bumped" or otherwise moved in close proximity to communicate. In one non-limiting example implementation, NFC may operate at 13.56 MHz and with an effective range of several centimeters (typically up to about 4 cm, or up to about 10 cm, depending upon the given implementation), but other suitable versions of near field communication which may have different operating frequencies, effective ranges, etc., for example, may also be used.

The system 30 further illustratively includes a mobile communications device 32 (also referred to herein as a "mobile device"). The mobile device 32 illustratively includes a second NFC device 33, a processor 34 coupled with the second NFC device 33, and one or more memories 35 coupled with the processor 34. Example mobile devices 32 may include portable or personal media players (e.g., music or MP3 players, video players, etc.), portable gaming devices, portable or mobile telephones, smartphones, tablet computers, digital cameras, etc. The processor 34 may be implemented using suitable hardware (e.g., a microprocessor, NFC and secure element control circuitry, etc.) and a non-transitory computer-readable medium with computer-executable instructions configured to perform the various operations described herein, for example.

The memory 35 defines a secure element 36, which is configured to store a set of NFC applets 37 for communicating with the first NFC devices 31a, 31b. By way of example, the memory 35 may comprise an internal memory (e.g., the memory on a NFC chipset of the mobile device 32), a removable memory (e.g., a secure digital (SD) or micro SD card), etc. In some embodiments, a plurality of memories 35 with respective secure elements 36 may be used, and the various NFC applets 37 may be distributed among the different secure elements. As such, the compatibility conflict determination and avoidance techniques described herein may apply between NFC applets 37 stored in or on a single (i.e., the same) secure element 36, or between NFC applets on different secure elements, as will be discussed further below.

More particularly, the various NFC applets 37 may be configured for communicating with respective types of NFC readers (e.g., payment terminals, security access terminals, etc.). Generally speaking, beginning at Block 50, the NFC applets 37 may be enabled for communicating with a respective NFC device 31a, 31b based upon an enablement request. The enablement request may be generated by a corresponding NFC application which runs on the operating system (OS) of the mobile device 32. For example, an NFC application may cause the OS to open a secure channel to a controller for the secure element 36 to request enablement of a respective or corresponding applet stored in the secure element 36. The enablement request may be generated responsive to a user request or input, or based upon the occurrence of another event, such as detection of proximity to the location of a given NFC device 31a, 31b via, for example, a satellite positioning device (e.g., GPS device), or responsive to a swipe or bump with a given one of the NFC devices 31a, 31b, for example.

Traditionally, secure elements such as those on a plastic credit card or security card included only one instantiated applet, namely a payment or security applet. However, use of the memory 35 and secure element 36 (or more than one memory or secure element in some implementations) along with the processor 34 may provide the ability for multiple NFC applets to be installed on and used by the mobile device 32.

Moreover, this may also allow more than one of the NFC applets 37 to be available or enabled for use over the NFC interface at a given time. That is, in some instances it may be desirable to enable a subset of the available NFC applets 37 for operation concurrently or simultaneously. For example, the mobile device 32 may be in an area where multiple NFC devices 31a, 31b are located within a relatively close area for which different NFC applets 37 may be called upon. However, with the convenience of having multiple NFC applets 37 operable on the same mobile device 32 may come the possibility for compatibility conflicts to arise between the different NFC applets when they are concurrently enabled.

By way of example, the NFC applets 37 may be configured to operate based upon different NFC communication formats (e.g., A, B, or F type), which have different respective operating frequencies associated therewith. Thus, in some implementations, a compatibility conflict may arise if two NFC applets 37 that use different NFC types or frequencies are concurrently enabled. For example, a given NFC chipset or secure element controller may not be configured to have different NFC frequencies enabled at a same time, so concurrently enabling different NFC applets 37 operating at different frequencies would result in a conflict.

In accordance with another example, the NFC applets 37 may have different identifications (IDs) associated therewith, and in some cases may have both long and short forms of IDs that are used to identify the respective NFC applet to the appropriate NFC devices 31a, 31b. While the IDs may identify the appropriate applets to respective NFC devices 31a, 31b, conflicts may also arise as between different NFC applets 37 based upon their respective IDs. For example, two payment applets may have the same short form IDs, such as if they are both VISA card applets. Accordingly, a conflict may occur if both VISA applets were simultaneously enabled, as the secure element controller may not be able to determine which of the applets an NFC device 31a is attempting to communicate with if the NFC device 31a refers to the applet by the short form ID, for example. However, if the given NFC applets 37 to be concurrently enabled do not have the same short form ID, for example, then such a conflict may not arise.

The processor 34 may accordingly be configured to determine whether concurrent enabling of a subset of the NFC applets 37 will or will not cause a compatibility conflict, at Block 52. By way of example, this may be done when a first NFC applet 37 is already enabled for NFC communication, and a second NFC applet requests to be enabled for NFC communication as well. That is, the processor 34 may determine potential compatibility conflicts in a reactive fashion by querying one or both of the first and second NFC applets 37 when necessary to determine if they have compatible (or incompatible) NFC frequencies, IDs, etc. However, in some embodiments, the processor 34 may make compatibility conflict determinations in a proactive fashion, such as through the use of a look-up table or database that is populated with frequency, ID, etc., information as new NFC applets 37 are installed or updated so that compatible and incompatible combinations of NFC applets are known ahead of time before enablement requests are made.

It should also be noted that the compatibility conflict determination may occur between NFC applets 37 stored on different secure elements, as noted above. For example, a conflict may arise where a first applet resides on a first secure element, and a second applet resides on a second secure element if the secure element controller or NFC circuitry is not configured to concurrently enable or access applets from different secure elements. Thus, a compatibility conflict check may include determining whether the applets to be concurrently enabled reside on different secure elements and, optionally, whether a special exception has been made to allow simultaneous enabling of the particular applets across secure element boundaries in the given implementation.

If it is determined that enabling the subset of NFC applets 37 (which may include two or more NFC applets in different embodiments) will not cause a compatibility conflict, the processor 34 may proceed to concurrently enable the subset of NFC applets for communicating data to the first NFC devices 31a, 31b via the second NFC device 33, at Block 53, which illustratively concludes the method of FIG. 2, at Block 54 (although the process illustrated in FIG. 2 may be repeated). As such, this allows for concurrent availability of different NFC applets 37 while helping to avoid compatibility conflicts between them, and may do so without the different NFC applets having to communicate or coordinate with one another.

On the other hand, if it is determined that enabling the subset of NFC applets 37 will cause a compatibility conflict, then the processor 34 may accordingly deny or prevent concurrent enabling of the NFC applets within the subset. Moreover, the processor 34 may in some embodiments be configured to provide a notification of the compatibility conflict to a user (e.g., via a display or output speaker) or a requesting application, or advise that appropriate action be taken (e.g., turning off one of the NFC applets, etc.), at Block 55. In another example, processor 34 may also be configured to suggest alternative subsets of NFC applets that may instead be enabled for concurrent use without causing a compatibility conflict.

The foregoing will be further understood with reference to example use cases illustrated in FIGS. 3-7. In the examples, the mobile device 30 provides a graphic user interface (GUI) for selecting various NFC applets (FIG. 3), although in different embodiments NFC applets may be accessible separately or individually. In the illustrated examples, first and second VISA payment card applets, a MasterCard payment card applet, a transit card applet, and a secure access applet are installed on the secure element 36. It may be desirable, in some instances, for a user of a device to have two or more of these applets enabled at the same time. For example, it may be desirable, in some instances, to have one payment applet (e.g., one of the VISA or MasterCard applets) and another applet (e.g., the transit card applet) available concurrently so that a user could, for example, make a payment or gain access using the transit card without having to enable and/or disable an applet. As another example, a user may wish to have two payment cards concurrently enabled, one to use most often (i.e., as a primary or default card) and a second to use somewhere that the first card is not supported for payment.

In some embodiments, once current enablement of two or more applets is requested, the processor 34 may query the appropriate NFC applets 37 for which concurrent enablement is requested to determine their preferred and/or acceptable radio frequencies. The processor 34 may then determine whether there is a possible match between the NFC applets desired by the user and the applets' respective preferred or acceptable radio frequencies. If there is a match between the requested applets (i.e., there is no compatibility conflict), the processor 34 may then enable the requested subset of NFC applets and switch off or otherwise disable other applets not within the subset.

In some embodiments, in the case of payment applets, for example, the processor 34 may also clear and re-configure a secure element Proximity Payment Environment System (PPSE) cache to prioritize the requested payment card (if applicable) as the top priority, for example. In these embodiments, if only one payment card is selected for activation, it may be the only card in the PPSE, but if more than one payment card is requested, the priority may be set by the user when requesting activation of multiple cards, or otherwise (e.g., in a default order, in the order requested, etc.).

As noted above, if a match is not made (i.e., there will be a compatibility conflict that results from concurrent enablement of the subset of NFC applets 37), the processor 34 may optionally notify the user of the conflict or suggest possible alternative valid combinations of applets.

Figure 4:
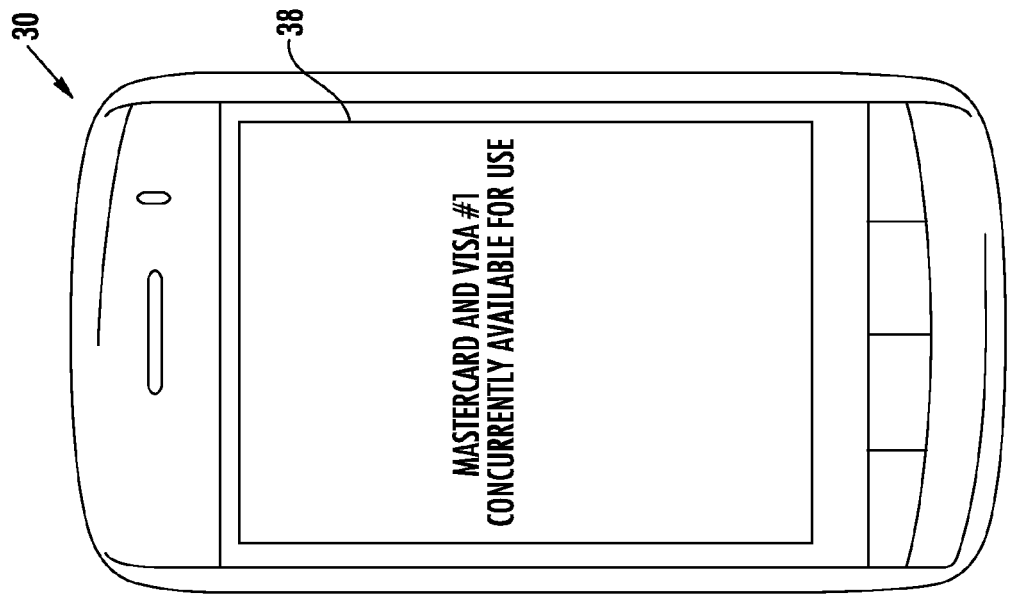
FIGS. 3-7 are a series of front views of an embodiment of the mobile device of FIG. 1 illustrating different concurrent enabling and compatibility conflict examples for various NFC applets.
Figure 5:
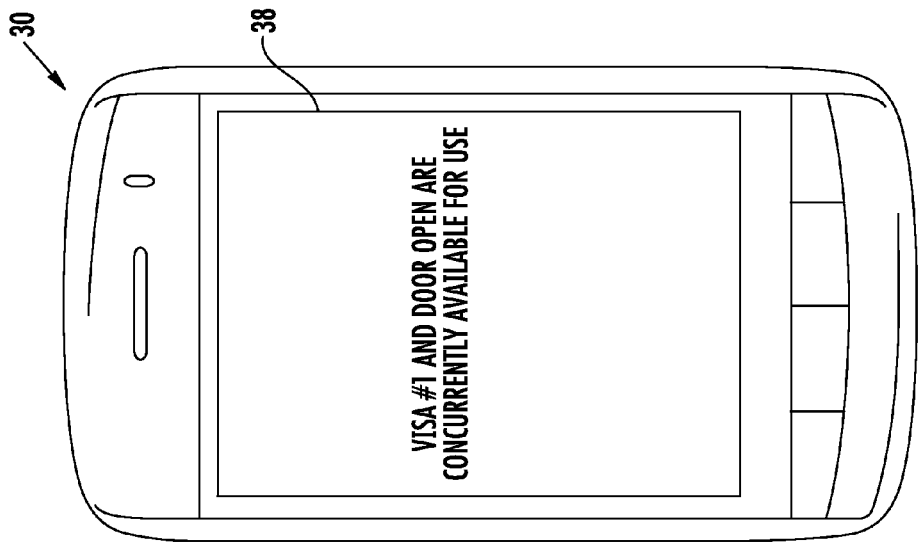

In the example illustrated in FIG. 4, an attempt has been made to concurrently enable the MasterCard payment applet and the first VISA card payment applet. In this example, since these applets are compatible in terms of NFC communication formats (i.e., both are A-type), and do not have the same short form ID (i.e., because one is VISA and the other is MasterCard), then no compatibility conflict exists, and a message may be provided on the display 38 noting that both applets have been successfully concurrently enabled. On the other hand, if concurrent enablement of both the first and second VISA card applets were attempted (FIG. 5), a compatibility conflict may arise since, in this example, both applets have the same short form ID. Accordingly, as illustrated in FIG. 5, a notification of the conflict is provided on the display 38, allowing user selection of one of the two requested applets with which to proceed.

Figure 3:
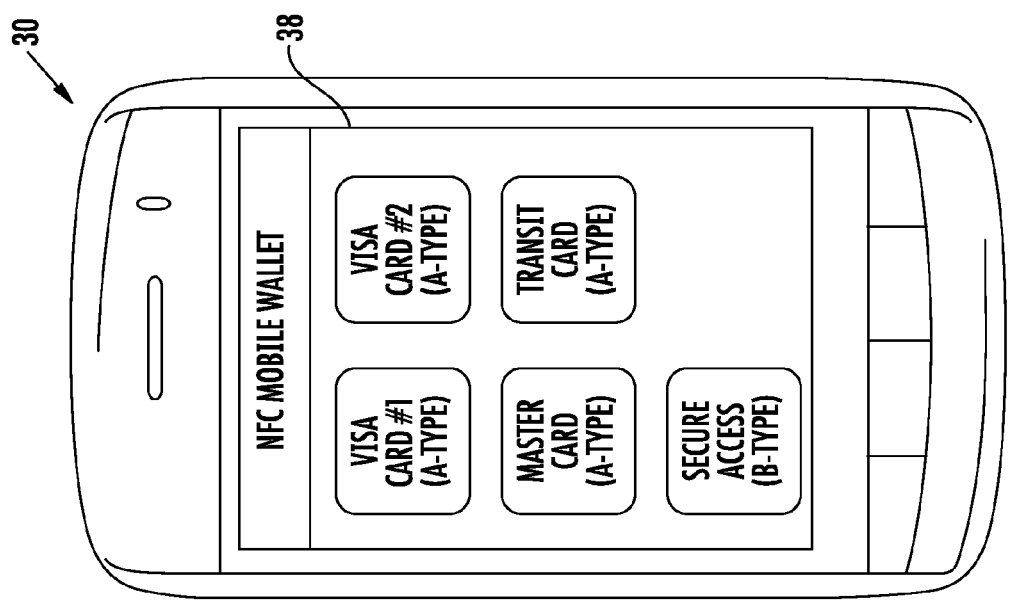
Figure 6:
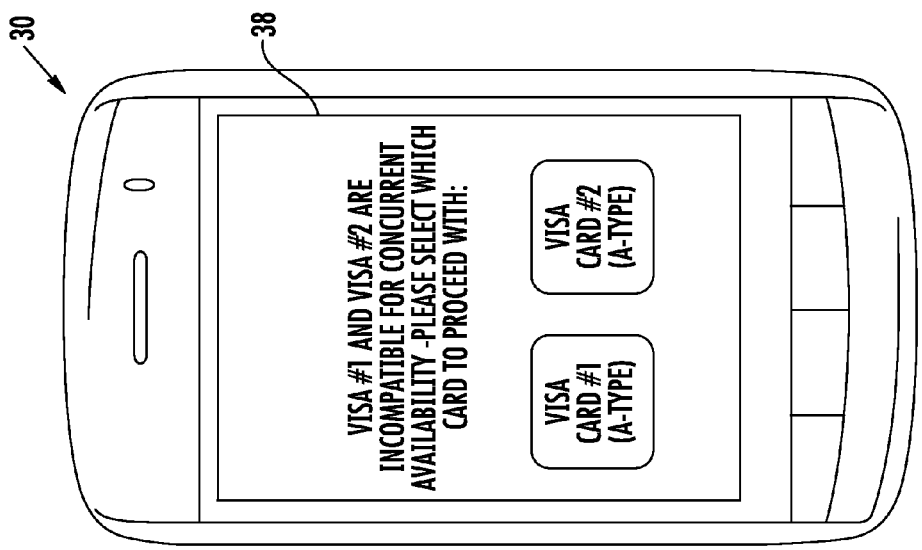
Figure 7:
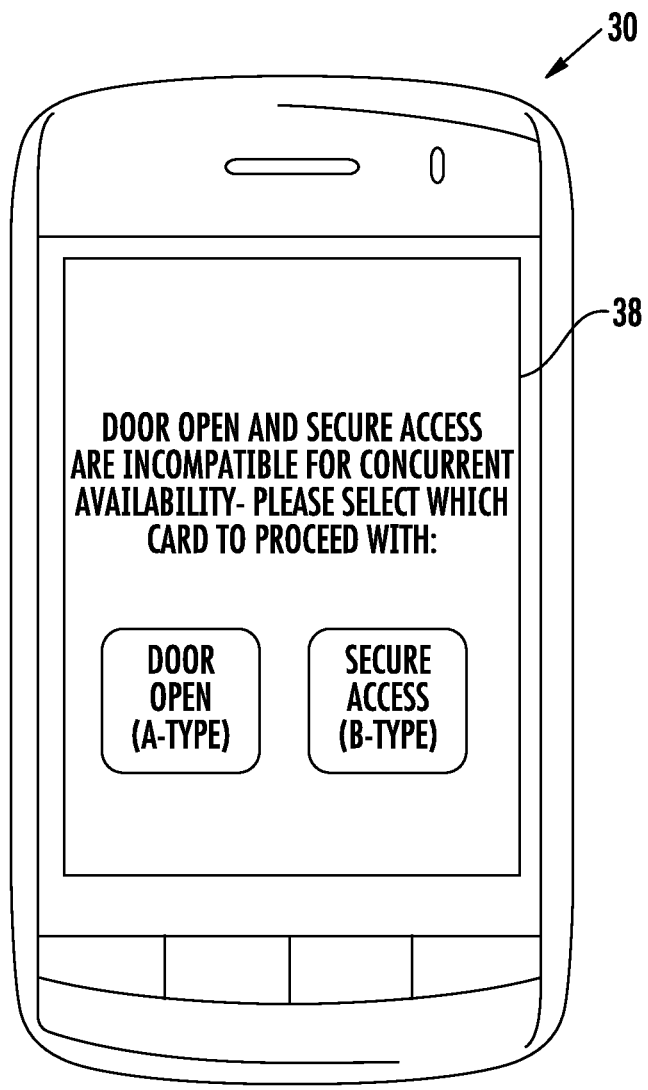

In the example shown in FIG. 6, concurrent enablement of the first VISA applet and the transit card applet has been attempted. In this case, since the NFC communication formats of the requested applets are compatible (both A-type), and since there are no ID conflicts, the first VISA applet and the transit card applet are concurrently enabled, as noted by a message on the display 38 as illustrated in FIG. 6 (although it should be noted that such messages are not required in all embodiments). As another example, when an attempt to concurrently enable the transit card applet and the secure access applet using the interface illustrated in FIG. 3 is made, a conflict arises due to their different NFC communications formats (A-type and B-type, respectively). Accordingly, a notification may be provided in this example to allow for selection of which applet is to be enabled, and which one is not, in view of the compatibility conflict, as illustrated in FIG. 7.

Example components of a mobile communications device 1000 that may be used in accordance with the above-described embodiments are further described below with reference to FIG. 8. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 8:
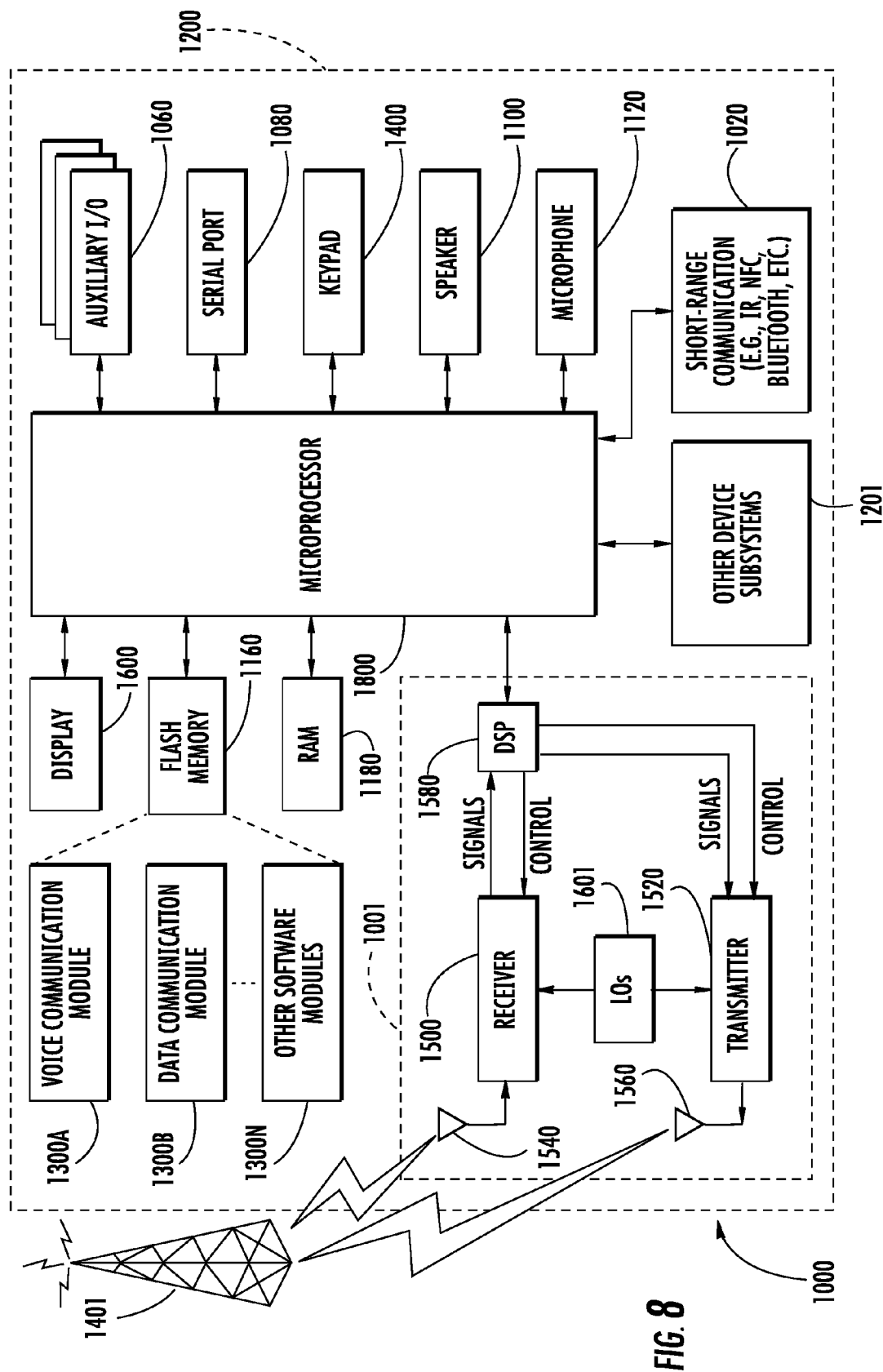
FIG. 8 is a schematic block diagram illustrating example mobile communications device components that may be used with the mobile devices shown in FIGS. 1 and 3-7.

In addition to the processing device 1800, other parts of the mobile device 1000 are shown schematically in FIG. 8. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A, and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile communications device comprising:
an input device;
a display;
a near field communication (NFC) device; and
a processor coupled with said input device, said display, and said NFC device, said processor being configured to
operate a first NFC applet and a second NFC applet,
determine whether concurrent enabling of the first NFC applet and the second NFC applet will cause a compatibility conflict,
concurrently enable the first NFC applet and the second NFC applet for communicating data via said NFC device based upon a determination that concurrent enabling of the first NFC applet and the second NFC applet will not cause the compatibility conflict, and
provide a notification on said display to allow user selection via said input device of whether the first or second NFC applet is to be enabled when it is determined that concurrent enabling of the first and second NFC applets will cause the compatibility conflict.

2. The mobile communications device of claim 1 wherein said NFC device is configured to operate in accordance with a first NFC frequency or a second NFC frequency;
wherein the first NFC applet is associated with the first NFC frequency and the second NFC applet is associated with the second NFC frequency; and wherein the compatibility conflict comprises an attempt to operate the NFC device at both the first NFC frequency and the second NFC frequency simultaneously.

3. The mobile communications device of claim 1 wherein the first NFC applet and the second NFC applet each have at least one respective applet identification (ID) associated therewith; and wherein the compatibility conflict comprises a conflict between the formats of the respective applet IDs.

4. The mobile communications device of claim 1 wherein said processor is configured to determine whether concurrent enabling of the first NFC applet and the second NFC applet will cause a compatibility conflict based upon requests to enable the first NFC applet and the second NFC applet.

5. The mobile communications device of claim 1 wherein the first NFC applet comprises a NFC payment applet.

6. The mobile communications device of claim 1 wherein the first NFC applet comprises a physical access NFC applet.

7. The mobile communications device of claim 1 further comprising at least one memory coupled with said processor and defining a plurality of secure elements configured to store NFC applets; and wherein said processor is configured to determine that concurrent enabling of the first NFC applet and the second NFC applet will cause a compatibility conflict based upon the first NFC applet and the second NFC applet being stored on different secure elements.

8. A communications system comprising:
at least one first near field communication (NFC) device; and
a mobile communications device comprising:
an input device;
a display;
a second near field communication (NFC) device; and
a processor coupled with said second NFC device, said processor being configured to
operate a first NFC applet and a second NFC applet,
determine whether concurrent enabling of the first NFC applet and the second NFC applet will cause a compatibility conflict,
concurrently enable the first NFC applet and the second NFC applet for communicating data via said second NFC device based upon a determination that concurrent enabling of the first NFC applet and the second NFC applet will not cause the compatibility conflict, and
provide a notification on said display to allow user selection via said input device of whether the first or second NFC applet is to be enabled when it is determined that concurrent enabling of the first and second NFC applets will cause the compatibility conflict.

9. The communications system of claim 8 wherein said second NFC device is configured to operate in accordance with a first NFC frequency or a second NFC frequency;
wherein the first NFC applet is associated with the first NFC frequency and the second NFC applet is associated with the second NFC frequency; and wherein the compatibility conflict comprises an attempt to operate the NFC device at both the first NFC frequency and the second NFC frequency simultaneously.

10. The communications system of claim 8 wherein the first NFC applet and the second NFC applet each have at least one respective applet identification (ID) associated therewith; and wherein the compatibility conflict comprises a conflict between the formats of the respective applet IDs.

11. The communications system of claim 8 wherein said processor is configured to determine whether concurrent enabling of the first NFC applet and the second NFC applet will cause a compatibility conflict based upon requests to enable the first NFC applet and the second NFC applet.

12. The communications system of claim 8 wherein said mobile communications device further comprises at least one memory coupled with said processor and defining a plurality of secure elements configured to store NFC applets; and wherein said processor is configured to determine that concurrent enabling of the first NFC applet and the second NFC applet will cause a compatibility conflict based upon the first NFC applet and the second NFC applet being stored on different secure elements.

13. A communications method comprising:
at a mobile communications device comprising an input device, a display, and a near field communication (NFC) device and being configured to operate a first NFC applet and a second NFC applet, determining whether concurrent enabling of the first NFC applet and the second NFC applet will cause a compatibility conflict; and
at the mobile communications device,
concurrently enabling the first NFC applet and the second NFC applet for communicating data via the NFC device based upon a determination that concurrent enabling of the first NFC applet and the second NFC applet will not cause the compatibility conflict, and
providing a notification on the display to allow user selection via the input device of whether the first or second NFC applet is to be enabled when it is determined that concurrent enabling of the first and second NFC applets will cause the compatibility conflict.

14. The method of claim 13 wherein the NFC device is configured to operate in accordance with a first NFC frequency or a second NFC frequency; wherein the first NFC applet is associated with the first NFC frequency and the second NFC applet is associated with the second NFC frequency; and wherein the compatibility conflict comprises an attempt to operate the NFC device at both the first NFC frequency and the second NFC frequency simultaneously.

15. The method of claim 13 wherein the first NFC applet and the second NFC applet each have at least one respective applet identification (ID) associated therewith; and wherein the compatibility conflict comprises a conflict between the formats of the respective applet IDs.

16. The method of claim 13 wherein determining comprises determining whether concurrent enabling of the first NFC applet and the second NFC applet will cause a compatibility conflict based upon requests to enable the first NFC applet and the second NFC applet.

17. The method of claim 13 wherein the mobile communications device comprises at least one memory defining a plurality of secure elements configured to store NFC applets; and wherein determining comprises determining that concurrent enabling of the first NFC applet and the second NFC applet will cause a compatibility conflict based upon the first NFC applet and the second NFC applet being stored on different secure elements.

18. A non-transitory computer-readable medium for a mobile communications device comprising an input device, a display, and a near field communication (NFC) device and being configured to operate a first NFC applet and a second NFC applet, the computer-readable medium having computer-executable instructions for causing the mobile communications device to perform steps comprising:
   determining whether concurrent enabling of the first NFC applet and the second NFC applet will cause a compatibility conflict;
   concurrently enabling the first NFC applet and the second NFC applet for communicating data via the NFC device based upon a determination that concurrent enabling of the first NFC applet and the second NFC applet will not cause the compatibility conflict; and
   providing a notification on the display to allow user selection via the input device of whether the first or second NFC applet is to be enabled when it is determined that concurrent enabling of the first and second NFC applets will cause the compatibility conflict.

19. The non-transitory computer-readable medium of claim 18 wherein the NFC device is configured to operate in accordance with a first NFC frequency or a second NFC frequency; wherein the first NFC applet is associated with the first NFC frequency and the second NFC applet is associated with the second NFC frequency; and wherein the compatibility conflict comprises an attempt to operate the NFC device at both the first NFC frequency and the second NFC frequency simultaneously.

20. The non-transitory computer-readable medium of claim 18 wherein the first NFC applet and the second NFC applet each have at least one respective applet identification (ID) associated therewith; and wherein the compatibility conflict comprises a conflict between the formats of the respective applet IDs.

21. The non-transitory computer-readable medium of claim 18 wherein determining comprises determining whether concurrent enabling of the first NFC applet and the second NFC applet will cause a compatibility conflict based upon requests to enable the first NFC applet and the second NFC applet.

22. The non-transitory computer-readable medium of claim 18 wherein the mobile communications device comprises at least one memory defining a plurality of secure elements configured to store NFC applets; and wherein determining comprises determining that concurrent enabling of the first NFC applet and the second NFC applet will cause a compatibility conflict based upon the first NFC applet and the second NFC applet being stored on different secure elements.

* * * * *